(12) United States Patent
Green

(10) Patent No.: US 9,368,966 B2
(45) Date of Patent: Jun. 14, 2016

(54) POWER SUPPLY ATTACHMENT

(76) Inventor: Andrew Bradford Green, Mt. Pleasant, SC (US)

(*) Notice: Subject to any disclaimer, the term of this patent is extended or adjusted under 35 U.S.C. 154(b) by 879 days.

(21) Appl. No.: 13/356,607

(22) Filed: Jan. 23, 2012

(65) Prior Publication Data
US 2013/0187459 A1    Jul. 25, 2013

(51) Int. Cl.
*H02J 1/00* (2006.01)
*H02J 3/00* (2006.01)
*H02J 7/00* (2006.01)
*H02M 7/00* (2006.01)

(52) U.S. Cl.
CPC .............. *H02J 3/00* (2013.01); *H02J 7/0052* (2013.01); *H02J 2007/0062* (2013.01); *H02M 7/003* (2013.01); *Y10T 307/406* (2015.04)

(58) Field of Classification Search
CPC .......................................................... H02J 3/00
USPC .................................................. 307/72
See application file for complete search history.

(56) References Cited

U.S. PATENT DOCUMENTS

| | | | |
|---|---|---|---|
| 4,025,140 A * | 5/1977 | Matys | 439/134 |
| 8,096,817 B2 * | 1/2012 | Lee et al. | 439/104 |
| 2007/0126290 A1 * | 6/2007 | Jaynes et al. | 307/150 |
| 2008/0211310 A1 * | 9/2008 | Jitaru et al. | 307/72 |
| 2011/0021040 A1 * | 1/2011 | Garb et al. | 439/13 |
| 2012/0256484 A1 * | 10/2012 | Kemp | 307/22 |
| 2012/0315972 A1 * | 12/2012 | Olson et al. | 463/17 |

\* cited by examiner

*Primary Examiner* — Jared Fureman
*Assistant Examiner* — Duc M Pham
(74) *Attorney, Agent, or Firm* — W. Edward Ramage; Baker Donelson

(57) ABSTRACT

A device that removably attaches to existing power supplies or adapters to provide power to one or more additional electronic devices, while not interfering or affecting the power being supplied to the primary or main electronic device by the power supply or adapter. The adapters, interfaces, connectors, cords and other components described herein may be used with any applicable electronic device, including portable electronic devices. In one embodiment, the device attaches to and provides power to a laptop computer power adapter, while simultaneously providing power to a USB port or interface.

17 Claims, 9 Drawing Sheets

POWER SUPPLY ATTACHMENT

FIELD OF INVENTION

This invention relates generally to an attachment to a separate power supply or power adapter for supplying power to electric devices, including portable electronic devices, and more specifically to an attachment providing a USB power supply without affecting the power supplied by the separate power supply or power adapter.

BACKGROUND OF THE INVENTION

A number of power adapters are widely known in the prior art for use in supplying power to a variety of portable electronic devices, including computers, tablets, cell phones, smart phones, media players, and the like. The power adapter receives power from an external power source supplying alternating current (AC) voltage, and converts it to direct current (DC) voltage for use by the device for operations or for recharging an internal battery. Power adapters may be limited to a single type of external power supply and may be device-specific, while others have interchangeable plugs or other input means to be used with multiple power supply sources, or that provide alternate outputs. Examples of such devices include the power adapters disclosed in U.S. Pat. Nos. 5,019,767; 5,684,689; and 6,086,395, and U.S. application Ser. No. 12/778,738, the specifications, drawings and disclosures of which are incorporated herein in their entireties by specific reference for all purposes.

Many portable electronic devices also can be powered through a Universal Serial Bus (USB) port, or similar port or connector, on a computer or similar apparatus. The USB port, for example, can be used to exchange data with the portable electronic device as well as supplying power. Detailed descriptions of the USB interface port are disclosed is U.S. Pat. Nos. 5,8984,086 and 6,086,430, which are incorporated herein in their entireties by specific reference for all purposes.

Many users have multiple devices that require frequent charging. These often require different, device-specific adapters, or multiple cables, which require the user to carry separate adapters around for each device. In addition, in many locations the number of plugs or connectors providing an AC power supply may be limited. With specific regard to USB-powered devices, while such a device can be "daisy-chained" through a USB port on a laptop computer or similar device that is, in turn, connected through its own adapter to an AC power supply, the power supplied through the USB is often restricted, leading to long recharge times for the USB-powered device. This is especially true for newer devices that require substantially more power than that provided by standard USB interfaces. Other use of the USB port also is preempted during that period.

While a number of power adapters are being fashioned with multiple alternative outputs, such devices are typically large and cumbersome, or require the user to select between the outputs. In addition, such adapters do not help users of computing devices supplied by other forms of power adapters. Accordingly, what is needed is a device that can be attached to existing power adapters by a user to provide a power supply to additional devices other than the main device receiving power from the power adapter, simultaneously with the power being provided to the main device without interfering or affecting that power.

SUMMARY OF INVENTION

In various embodiments, the present invention comprises a device that removably attaches to existing power supplies or adapters to provide power to one or more additional electronic devices, while not interfering or affecting the power being supplied to the primary or main electronic device by the power supply or adapter. The adapters, interfaces, connectors, cords and other components described herein may be used with any applicable electronic device, including portable electronic devices. Such devices include, but are not limited to, computer, laptop computers, notebook computers, tablet computing devices, cell phones, smart phones, personal digital assistants (PDAs), media or music players, recorders, televisions, speakers, earphones, headphones, and the like.

In one exemplary embodiment, the present invention comprises an ancillary adapter removably attached to a separate power adapter, such as the power brick or adapter manufactured by Apple Inc. for use with its laptop computers (including but not limited to a MacBook laptop computer). The plug adapter element of the separate power adapter is removed, and the ancillary adapter inserted in its place.

In this embodiment, the ancillary adapter comprises an L-shaped body with a front, top, back, and bottom. The bottom comprises a pair of male plugs or prongs of the appropriate type and configuration to be inserted into the female receptacles in the top of the separate power adapter. A slot in the "toe" of the L-shape may be used to secure the ancillary adapter by sliding over a protrusion on the separate power adapter. The ancillary adapter is configured so that, when inserted, it forms a contiguous unit with the separate power adapter. The ancillary adapter may have alternative configurations other than the L-shaped body to fit with other forms of power adapters.

The front of the ancillary unit comprises a male plug component, configured to be plugged into a power supply, such as a wall plug. While the figures show the male plug component as a standard two-prong component suitable for AC wall plugs in the United States, other plug configurations adapted for other power supply systems may be used. In one embodiment, the male plug component can be rotated or hinged at one end to be received in slots in the body of the ancillary unit, or may be retractable.

The back of the ancillary adapter comprises a power outlet or port. In one embodiment, the port is a USB interface, although other forms of power outlets or ports may be used. In an alternative embodiment, multiple power outlets or ports may be present, and the port or ports also may be located on other parts of the ancillary adapter, including the top or sides. In yet another embodiment, one or more power wires or cables may extend from the back, top or sides of the ancillary adapter, either in place of or in addition to a port or ports.

The ancillary unit splits the AC power received from the power supply, and provides AC power through power outlet or port provides AC power through the male plugs or connection to the separate power adapter to which it is attached. It also separately converts the supplied AC power to an appropriate type and level for the power outlet or port. The ancillary unit thus may comprise its own AC/DC converter and other components which are used in a power adapter, and are well known in the art.

In one exemplary embodiment, the power outlet or port is a 10-watt USB port, which provides substantially more power than is available through standard USB ports on a computer, thus providing the ability to charge a USB device, such as a tablet computing device or smart phone, much more quickly. The higher level of power supplied also allows the ancillary adapter to be used to provide operating power to devices that require higher levels of power, such as the iPad tablet computing device manufactured by Apple Inc.

In another exemplary embodiment, the ancillary adapter may be used as a stand-alone power adapter. A cover or cap may be attached or inserted onto the bottom of the ancillary adapter in this configuration. The cap may be of any suitable size. The cap may be configured so that the ancillary adapter and cap form a box-like unit when attached. The cap may be solid or hollow, in whole or in part. In one exemplary embodiment, the hollow interior portion of the cap may be used for storage of various small items.

DETAILED DESCRIPTION OF EXEMPLARY EMBODIMENTS

Figure 1:
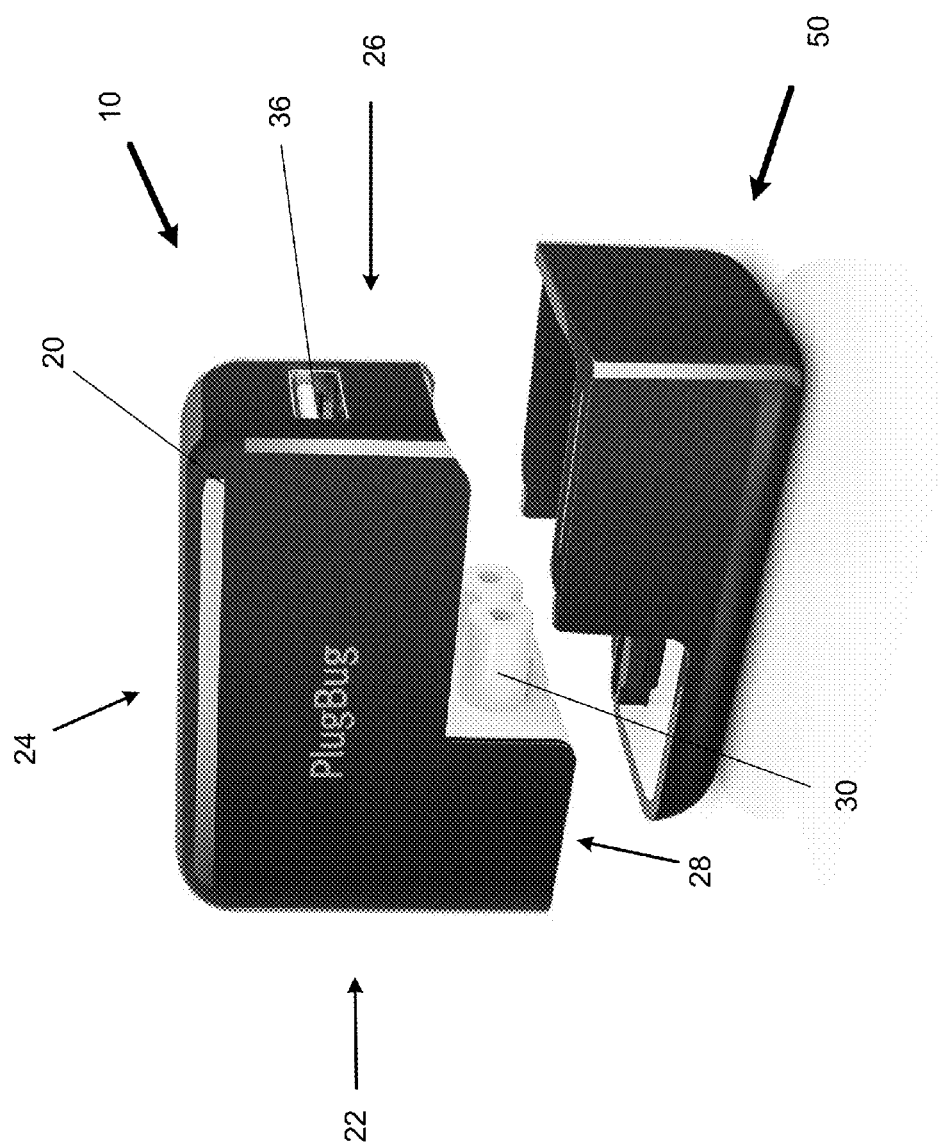
FIG. 1 shows a perspective view of an ancillary adapter and cap in accordance with an embodiment of the present invention.

In various exemplary embodiments, as described herein, the present invention is a device that removably attaches to existing power supplies or adapters to provide power to one or more additional electronic devices, while not interfering or affecting the power being supplied to the primary or main electronic device by the power supply or adapter. The adapters, interfaces, connectors, cords and other components described herein may be used with any applicable electronic device, including portable electronic devices. Such devices include, but are not limited to, computer, laptop computers, notebook computers, tablet computing devices, cell phones, smart phones, personal digital assistants (PDAs), media or music players, recorders, televisions, speakers, earphones, headphones, and the like.

In one exemplary embodiment, as shown in FIGS. 1-9, the present invention comprises an ancillary adapter 10 removably attached to a separate power adapter 2, such as the power brick or adapter manufactured by Apple Inc. for use with its laptop computers (including but not limited to a MacBook laptop computer), as disclosed in U.S. Pat. No. D478,310, the entirety of which is incorporated herein by specific reference for all purposes. The plug adapter element of the separate power adapter is removed, and the ancillary adapter 10 inserted in its place.

In this embodiment, the ancillary adapter 10 comprises an L-shaped body 20 with a front 22, top 24, back 26, and bottom 28. The bottom comprises a power outlet portion, which may comprise a set or pair of male plugs 30 of the appropriate type and configuration to be inserted into matching female receptacles in the top of the separate power adapter. Different connectors may be used, such as reversing the male and female components of the connection, or a simple power contact. A slot 31 in the "toe" of the L-shape may be used to secure the ancillary adapter by sliding over a protrusion on the separate power adapter. The ancillary adapter is configured so that, when inserted, it forms a contiguous unit with the separate power adapter. The ancillary adapter may have alternative configurations other than the L-shaped body to fit with other forms of power adapters.

The front 22 of the ancillary unit comprises power input portion, such as a male plug component 32, configured to be plugged into a power supply. While the figures show the male plug component as a standard two-prong component suitable for AC wall plugs in the United States, other plug configurations adapted for other power supply systems may be used. In one embodiment, the male plug component can be rotated or hinged at one end to be received in slots 33 in the body of the ancillary unit, or may be retractable.

The back 26 of the ancillary adapter comprises a second power outlet or port 36. In the embodiment shown, the port is a USB interface, although other forms of power outlets or ports may be used. In an alternative embodiment, multiple power outlets or ports may be present, and the port or ports also may be located on other parts of the ancillary adapter, including the top or sides. In yet another embodiment, one or more power wires or cables may extend from the back, top or sides of the ancillary adapter, either in place of or in addition to a port or ports.

The ancillary unit splits the AC power received from the power supply, and provides AC power through the first power outlet (e.g., male plugs 30) to the separate power adapter to which it is attached. It also separately converts the supplied AC power to an appropriate type and level for the power outlet or port 36. The ancillary unit thus may comprise its own AC/DC converter and other components which are used in a power adapter, and are well known in the art.

In one exemplary embodiment, the power outlet or port is a 10-watt USB port, which provides substantially more power than is available through standard USB ports on a computer, thus providing the ability to charge a USB device, such as a tablet computing device or smart phone, much more quickly. The higher level of power supplied also allows the ancillary adapter to be used to provide operating power to devices that require higher levels of power, such as the iPad tablet computing device manufactured by Apple Inc.

Figure 2:
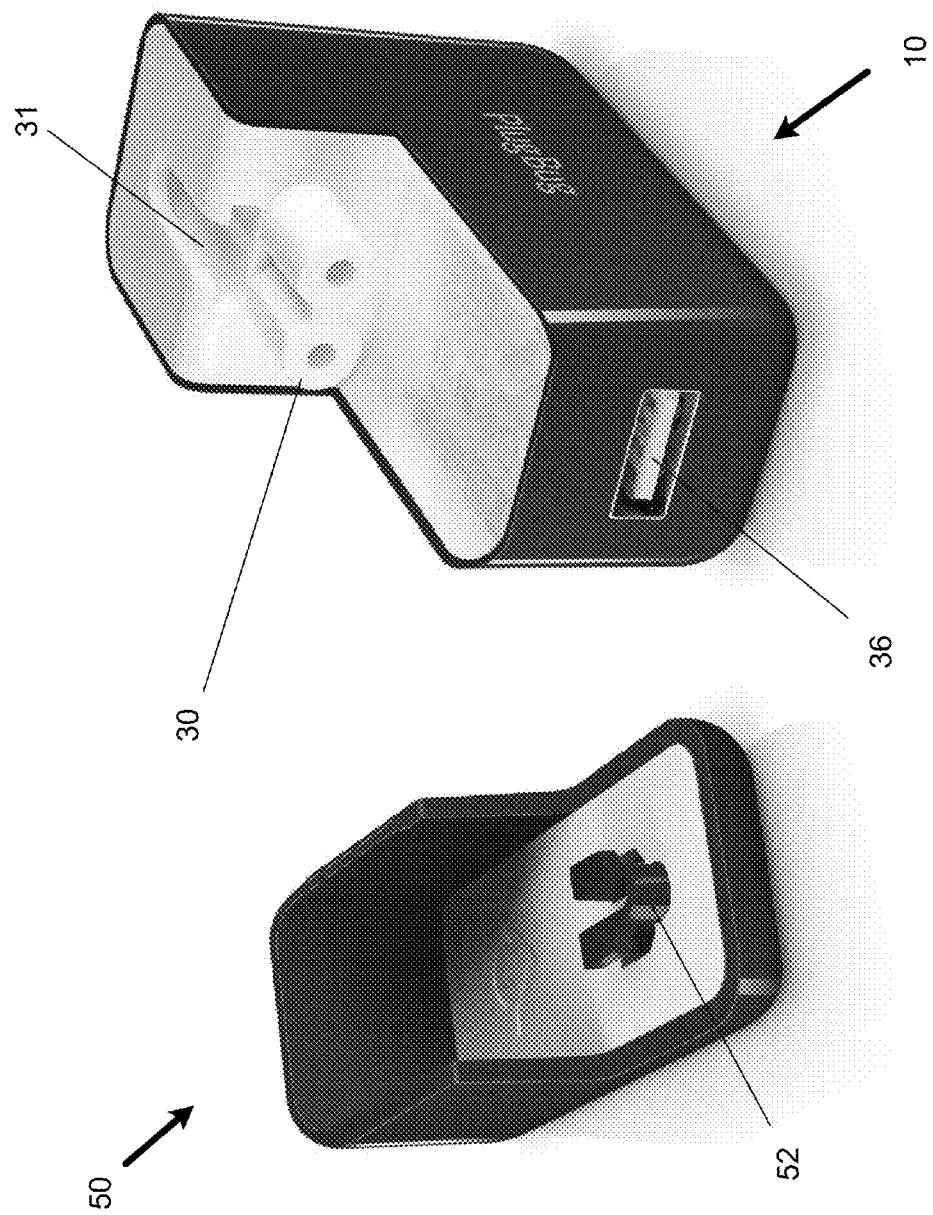
FIG. 2 shows another perspective view of the ancillary adapter and cap of FIG. 1.
Figure 3:
FIG. 3 shows another perspective view of the ancillary adapter and cap of FIG. 1.
Figure 4:
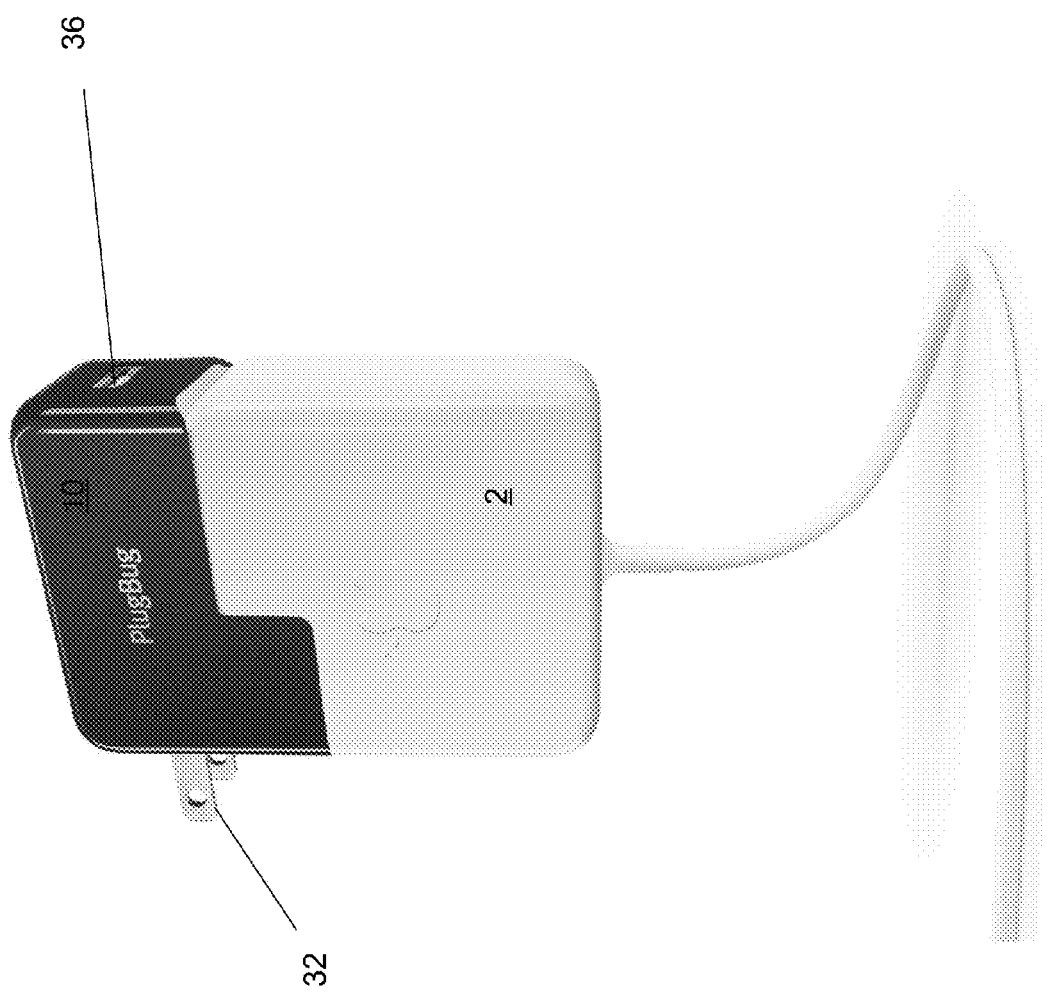
FIG. 4 shows a perspective view of an ancillary adapter connected to a separate power adapter in accordance with another embodiment of the present invention.
Figure 5:
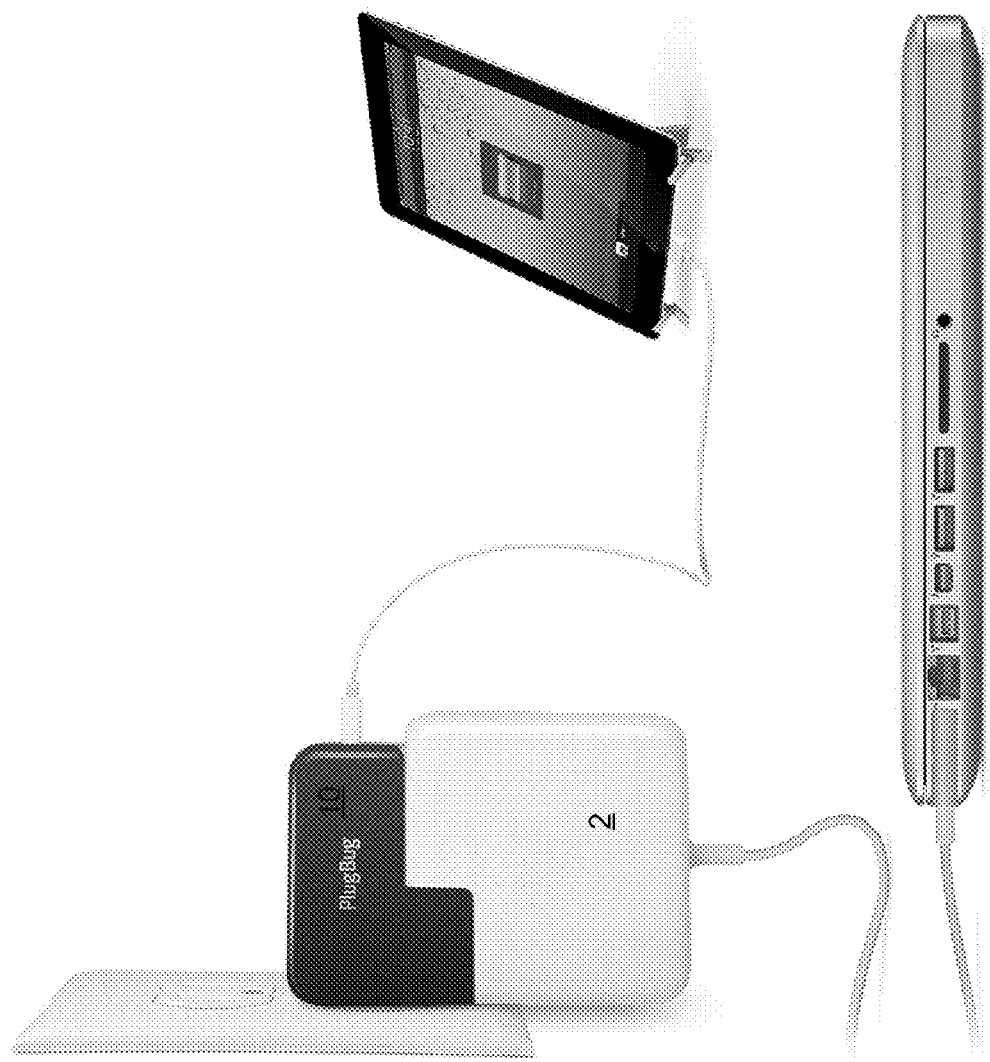
FIG. 5 shows a side view of the ancillary adapter of FIG. 4 in use with two electronic devices.
Figure 6:
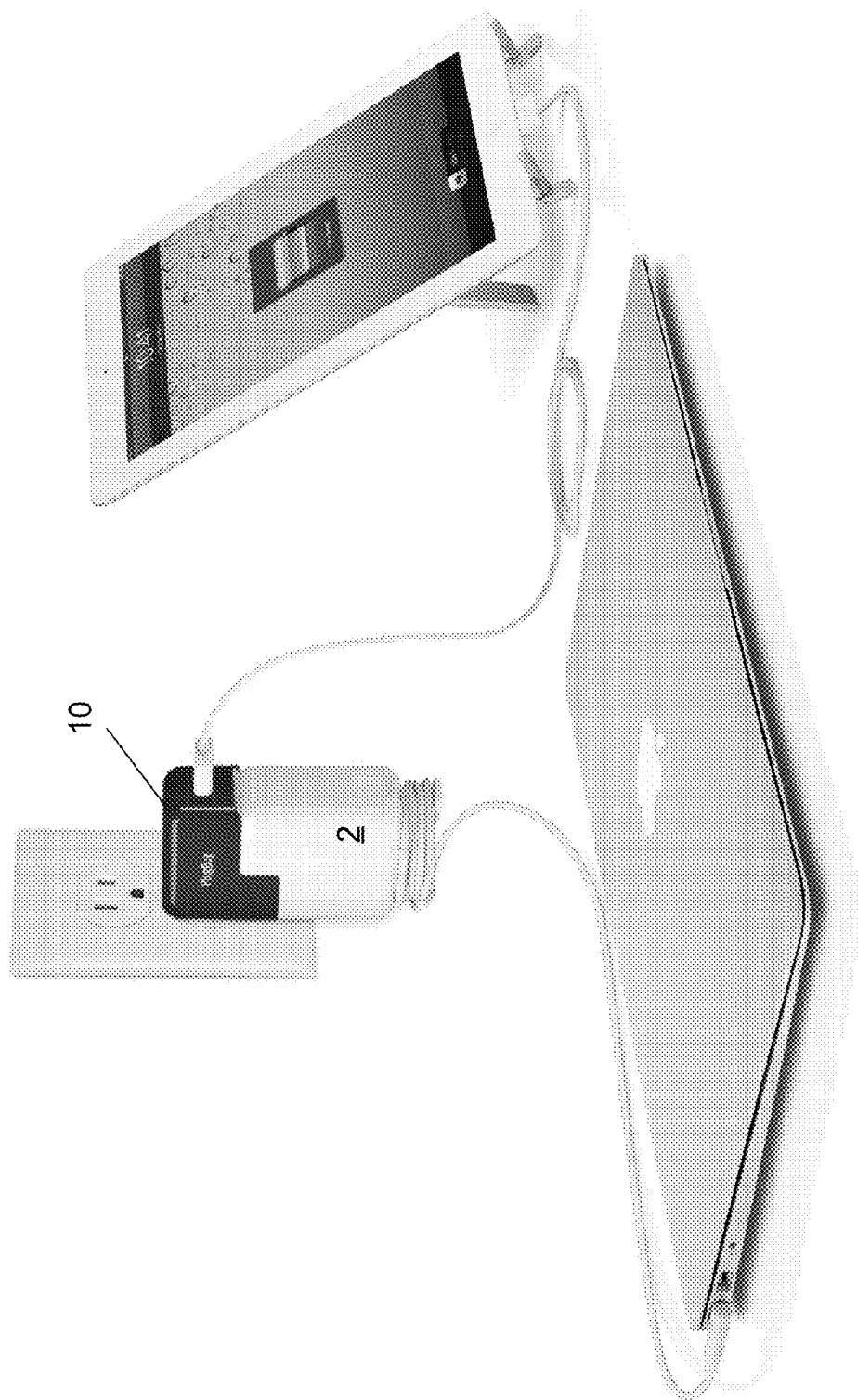
FIG. 6 shows a perspective view of the ancillary adapter of FIG. 4 in use with two electronic devices.
Figure 7:
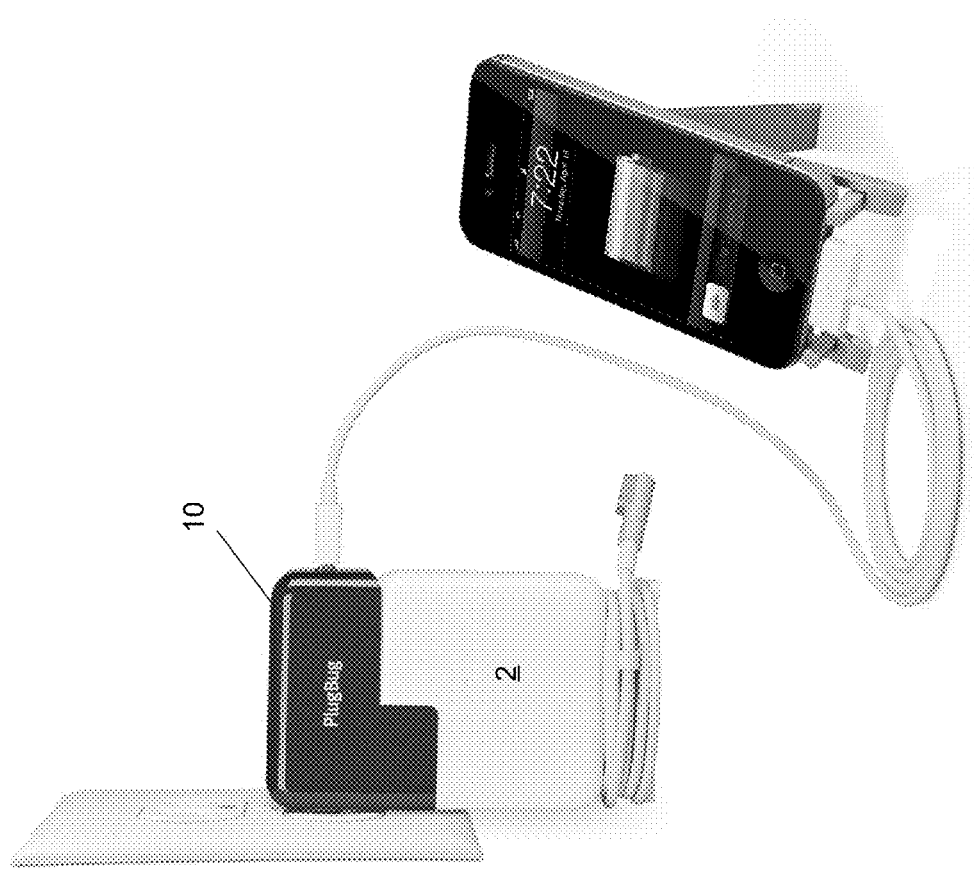
FIG. 7 shows a side view of the ancillary adapter of FIG. 4 in use with an electronic device.
Figure 8:
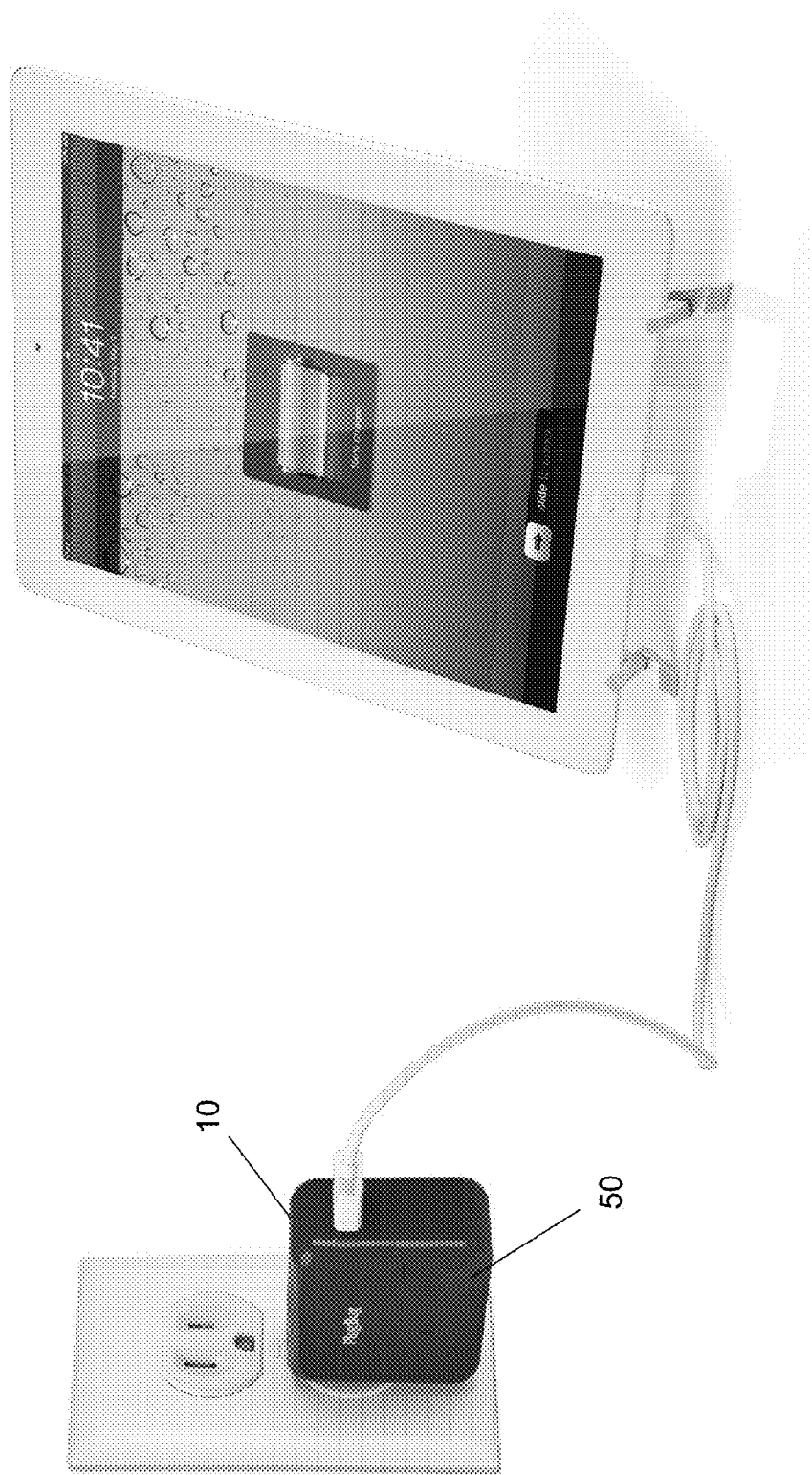
FIG. 8 shows a perspective view of the ancillary adapter and cap of FIG. 1 in use with an electronic device.
Figure 9:
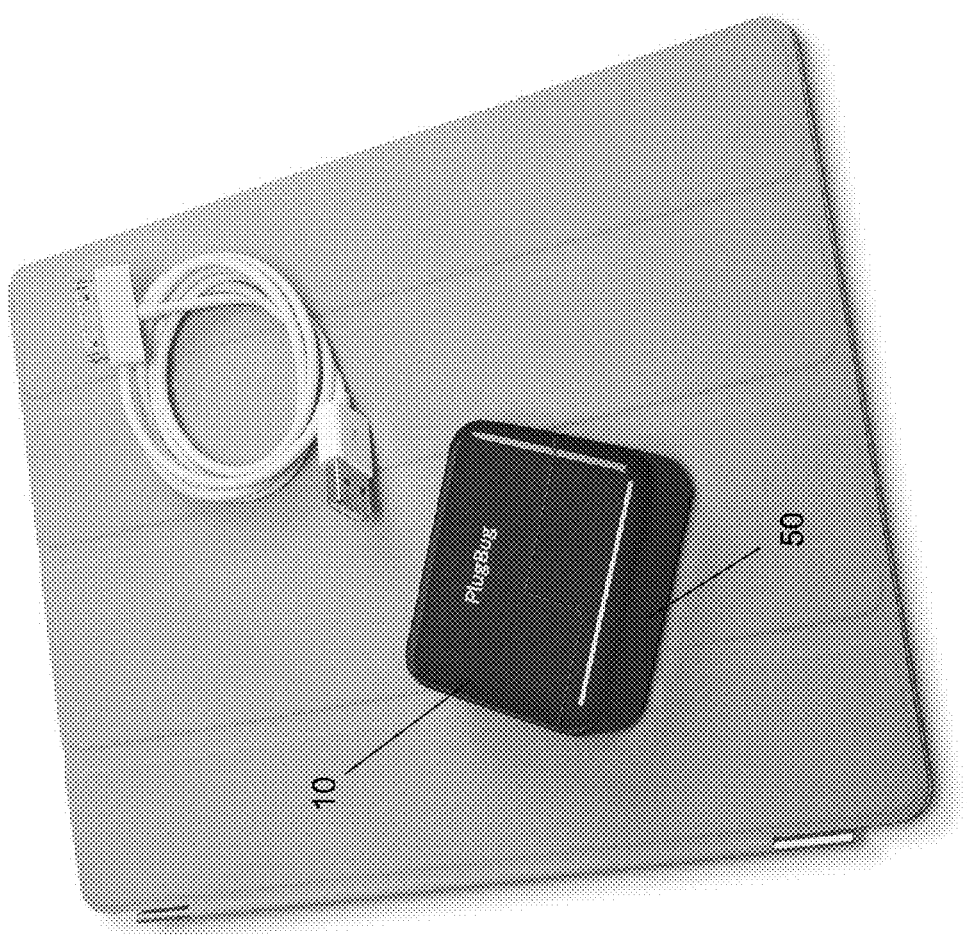
FIG. 9 shows a view of the ancillary adapter and cap of FIG. 1 with a USB cable.

In another exemplary embodiment, the ancillary adapter may be used as a stand-alone power adapter. A cap or cover 50 with a protrusion 52 adapted to slide into the slot 31, or with receptacles adapted to receive the male plugs 30, may be attached or inserted onto the bottom of the ancillary adapter in this configuration. Other means of attachment may be used, such as a snap or holder. The cap may be of any suitable size. As shown in FIGS. 1-3, the cap may be configured so that the ancillary adapter and cap form a box-like unit when attached. The cap 50 may be solid or hollow, in whole or in part. In one exemplary embodiment, the hollow interior of the cap may be used for storage for various small items (such as a USB cable). In embodiments with a sufficiently large cap, the interior may be enclosed, and the cap may have a lid or can be opened to provide access to the interior.

The body of the ancillary adapter and cap may be made of any suitable material, including, but not limited to, plastic. They may be colored, patterned, solid, transparent, translucent, or any combination thereof. They may match the color of the separate power adapter, or may be a noticeably distinct color. In one exemplary embodiment, the ancillary adapter is bright red in color, providing a distinctive look that is attractive to users and makes the device more noticeable, and thus easier to spot in a backpack, bag or purse.

The relatively small size and low weight of several embodiments of the ancillary adapter also is a significant advantage. In one exemplary embodiment, the ancillary adapter with cap inserted is 2.1 inches high, 2.57 inches wide, 1.14 inches in depth, and weighs 0.15 pounds. Power input is AC 100~240V, 50/60 Hz, 1.7 A. The USB power outlet is 5V @ 2.1 A. The connector power outlet is AC 100~240V 50/60 Hz, 1.5 A.

Accordingly, the present invention allows the user to simultaneously charge or provide power to a laptop computer or similar computing device alone with a tablet computing device or smart phone from a single power outlet. It charges the tablet computer or other device much more quickly and without using a USB or other port on the laptop computer.

One particular advantage of the embodiment shown in FIGS. 1-6 is that this configuration fits all current and previous power adapters used with MacBook, MacBook Pro, and MacBook Air computing devices manufactured by Apple Inc., as well as the Apple Battery Charger, Airport Express, Apple USB chargers, and other chargers with the removable plug adapter element.

A further advantage is that the ancillary adapter can be used with international power adapters, thereby converting an international power adapter into a North American compatible adapter. Likewise, the ancillary adapter may be made with different plug components suitable for other power supplies, allowing the invention to be used as an international power adapter. In one embodiment, the male plug component on the ancillary adapter is removable, allowing different plug components to be used for other power supplies.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus for providing power, comprising:
   a case;
   a power input portion on the exterior of said case and capable of being connected to a power source;
   a first power output on the exterior of said case providing power of the same voltage and current type as the power source received by the power input portion, said first power output adapted to connect to a separate power adapter; and
   a second power output on the exterior of said case providing power of a different voltage and current type than the power source received by the power input portion, wherein power is supplied by said first and second power outputs simultaneously;
   wherein the power input portion, first power output, and second power output are integrated with the case; further wherein the case is configured to be attached to the separate power adapter.

2. The apparatus of claim 1, wherein the case is L-shaped to fit onto a separate power adapter with a stepped top.

3. The apparatus of claim 1, wherein the power input portion comprises a pair of prongs.

4. The apparatus of claim 3, wherein the prongs are hinged or retractable.

5. The apparatus of claim 1, wherein the second power output is a USB port or interface.

6. The apparatus of claim 5, wherein the USB port provides 10 W of power.

7. The apparatus of claim 1, further comprising a cap, wherein the cap is configured to be removably attached to the case to cover the first power outlet.

8. The apparatus of claim 7, wherein the cap is hollow.

9. A power adapter system, comprising:
   a first power adapter comprising a power input portion adapted to receive detachable power connection modules, and a power output cord or cable adapted to provide power to an electronic device; and
   an ancillary power adapter attachment, said adapter attachment comprising:
   (a) a case;
   (b) an attachment power input portion on the exterior of said case and capable of being connected to a power source;
   (c) a first attachment power output providing power of the same voltage and current type as the power source received by the attachment power input portion, said first attachment power output adapted to connect to the power input portion of the first power adapter; and
   (d) a second attachment power output providing power of a different voltage and current type than the power source received by the attachment power input portion, wherein power is supplied by said first and second attachment power outputs simultaneously.

10. The system of claim 9, wherein the ancillary power adapter attachment is configured to removably attach to said first power adapter to form a contiguous unit.

11. The system of claim 9, wherein the power input portion of the first power adapter is on a side of the first power adapter that is stepped, and the case is L-shaped to fit onto said stepped side when the ancillary power adapter attachment is attached to said first power adapter.

12. The system of claim 9, wherein the attachment power input portion comprises a pair of prongs.

13. The system of claim 12, wherein the prongs are hinged or retractable.

14. The system of claim 9, wherein the second attachment power output is a USB port or interface.

15. The system of claim 14, wherein the USB port provides 10 W of power.

16. The system of claim 9, wherein the ancillary power adapter attachment is a different color than the first power adapter.

17. The system of claim 9, wherein the case of the ancillary power adapter attachment is red in color, in whole or in part.

* * * * *